United States Patent Office 2,939,361
Patented June 7, 1960

2,939,361

PHOTOMETRIC APPARATUS COMPENSATED FOR FLUCTUATIONS IN LIGHT SOURCE INTENSITY

Fromund Hock, Krofdorf, Kreis Wetzlar, am Wettenberg, Germany, assignor to Ernst Leitz, G.m.b.H., Wetzlar, Germany Filed May 8, 1956, Ser. No. 583,566

Claims priority, application Germany May 20, 1955

1 Claim. (Cl. 88—14)

The present invention relates to photometric apparatus and more particularly to photoelectric measuring apparatus of this character which includes means for compensating for variations in the intensity of illumination emitted by the light source.

In the case of photometers or other photometric apparatus operating with photosensitive cells, errors in the results of the measurement can easily be caused if the required sources of light are not of precisely constant illumination intensity, for instance, errors in measurement may be caused as a result of voltage variations.

I have found that certain circuit arrangements may be employed which utilizes two separate luminous fluxes emanating from a single light source and thus eliminate errors which might otherwise be caused by variations in the brilliance or intensity of the illumination produced by the light source.

The usual manufacturing cost required for this purpose is ordinarily unjustifiably high since, for instance, a second amplifier is necessary to provide compensation for the total luminous flux or else costly screening and control devices are required if the amplification of the luminous flux is to be effected in a single channel or common amplifier.

It is an object of the present invention to provide a simplified self-compensating photoelectric measuring circuit which is unaffected in the accuracy of its measurement results by minor variations in the illumination intensity produced by its light source as a result of voltage fluctuations, aging or the like.

The circuit arrangement in accordance with the invention makes it possible with a minimum of expense to obtain a high degree of accuracy and independence of the measurement results with respect to various or internal influences affecting the light source. The present invention is characterized by the use of two separate photosensitive circuit elements or cells, one of which changes its resistance, at least incrementally in the vicinity of its operating illumination level, in inverse proportion to the intensity of illumination while the other, being energized from a suitable voltage source, changes its current flow incrementally in direct proportion to the intensity of illumination. Photosensitive cells which comply with the first or variable resistance requirement are the well-known semiconductor resistors (cadmium sulfide, lead sulfide, etc.). The second or variable current requirement is met by vacuum type photoelectric cells, phototransistors, barrier-layer photoelectric cells, etc.

In its simplest form, the circuit of the present invention comprises two incrementally oppositely light responsive photosensitive cells, connected in series. The variable current cell is disposed in the path of a measurement light beam and the variable resistance cell is arranged in the path of a compensation beam, both beams originating from the same single light source. The measurement signal is derived as a potential drop across the variable resistance cell. This measurement signal is amplified to such extent as may be required and applied to an indicator or other utilization means for observation or recording.

In another form of the invention, an amplifier tube is included in the circuit. Conveniently, this may take the form of a triode connected as a cathode follower. The control grid of the triode is connected with the variable current cell to vary the space current through the triode. The variable resistance cell is included in the anode-cathode circuit of the triode. The measurement signal is derived as a potential drop across the variable resistance cell. It is also possible to include the variable resistance cell in an amplifier having its input connected to the variable current cell, the variable resistance cell being included as a working resistive circuit element in a suitable portion of the amplifier circuit. Where the variable resistance cell is thus included in an amplifier circuit, and particularly if its resistance-illumination characteristic is not accurately linear throughout its entire working range of illumination, the circuit may be arranged to compensate not only for non-linearities of the photosensitive element but also for non-linearities in the amplifier tube characteristics.

Various other objects, features and advantages of the invention will become apparent upon reading the following specification together with the accompanying drawing forming a part hereof.

Referring to the drawing.

Figure 1:
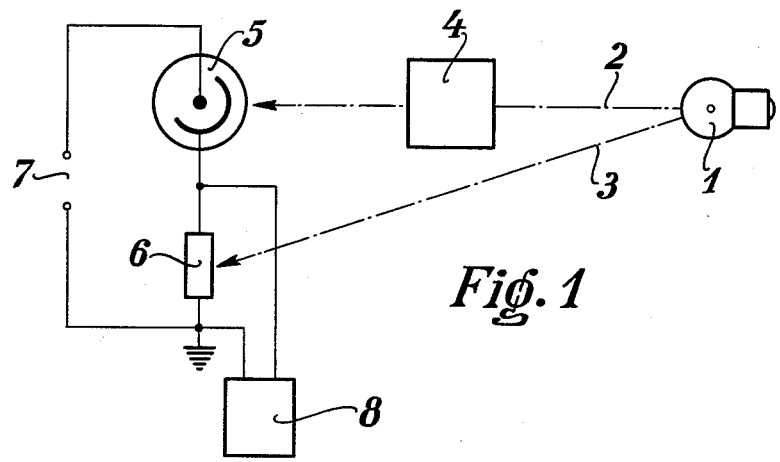
Figure 1 is a circuit diagram showing an embodiment of the invention comprising two oppositely responsive photosensitive circuit elements connected directly in series.

Referring to Fig 1, a single common light source shown as an incandescent lamp 1 emits a measurement light beam 2 and a compensatory light beam 3.

The measurement beam 2 passes through a test of measurement specimen 4 indicated diagrammatically as a rectangle. The transparency, opacity, or some other light transmission characteristic of the specimen 4 is to be measured by its effect upon the intensity of the measurement light beam 2 during the course of its passage through the measurement specimen 4. After passage through the interposed specimen 4, the measurement beam 2 arrives at the variable current photocell 5, shown as a vacuum type photocell having an anode and a photosensitive electron emitting cathode.

The compensatory beam 3 passes directly to the variable resistance photocell diagrammatically indicated by the rectangle 6. As stated above, the variable resistance photocell 6 may conveniently be formed of a semiconductor such as cadmium sulfide, lead sulfide, or the like. The series combination of photocells 5 and 6 is energized from a suitable common source of direct current potential (not shown) which is connected to terminals 7, its negative terminal being connected to ground. An indicating device diagrammatically shown as a rectangle 8, and which may also include any required amplifying means, is shown connected to measure the potential drop across the variable resistance photocell 6.

In operation, variations in the transparency or other light transmission characteristic of the specimen 4 interposed in the measurement light beam 2, will directly affect the emission from the cathode of the variable current photocell 5 and cause corresponding variations in the current flow through the series circuit comprising both photocells 5 and 6. Preferably, these variations are of a linear nature with respect to incremental variations in illumination intensity. So long as the intensity of illumination provided by the light source 1 remains constant, the resistance of variable resistance photocell 6 will remain constant and any variations in current flow caused by the effect of different measurement specimens such as specimen 4 on light beam 2 will remain exactly as they would be if the variable resistance photocell 6 were an ordinary resistor of constant resistance.

That is to say, a change of light transmission by the test specimen will result in a like change of current flow, and in a like change of voltage at the output side of photocell 5. If, however, the light emission from light source 1 should be reduced, as by a drop in its energizing voltage, then the illumination on variable resistance photocell 6 will decrease correspondingly. The decrease in illumination of photocell 6 will be accompanied by an increase in its resistance and a correspondingly increased percentage of voltage drop across its terminals as compared with the entire voltage drop. The voltage output of photocell 5 will, however, be simultaneously reduced. By proper dimensioning of the circuit elements, and particularly the photocells, the increase in resistance in variable resistance photocell 6 may be made to compensate to the required degree of precision for the reduced voltage output of the variable current photocell 5, not only for static conditions but also with respect to incremental or kinetic variations.

With such compensation provided the readings of voltmeter 8, which serves by electrical analog as a quantitative indicator of the light transmission characteristic measurement of specimen 4, directly readable as such, will be the same throughout a narrow but practical range of variation of the intensity of the light source 1. Other absorption materials can be substituted for the sample 4 and tested, and they too, will yield characteristic direct quantitative readings on the meter 8 which are independent of usual variations of intensity of the light source 1.

Figure 2:
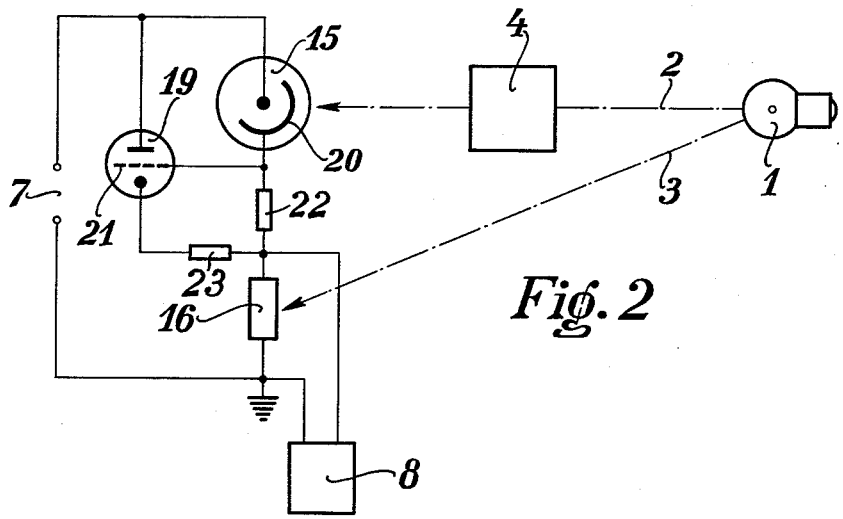
Figure 2 is a circuit diagram showing two similarly oppositely responsive photosensitive elements connected with each other through a triode which serves as an impedance matching device.

Referring to Fig. 2, the light source 1, the measurement beam 2, compensatory beam 3 and specimen 4 are arranged as described above for Fig. 1. The variable current photocell 15 and variable resistance photocell 16 are both included in a series circuit energized by a direct current source connected to terminals 7 as in the case of Fig. 1. The indicator 8 is similarly connected across the terminals of the variable resistance photocell 16. A triode 19 is provided and its control grid 21 is connected to the photosensitive electron emitting cathode 20 of the variable current photocell 15. A coupling resistor 22 is included in the series circuit, being interposed between the photosensitive cathode 20 and the positive terminal of variable resistance photocell 16. The coupling resistor 22 applies potential variations to the control grid 21 in accordance with the output voltage of photocell 15. A biasing resistor 23 is connected between the cathode of triode 19 and the positive terminal of variable resistance photocell 16. The biasing resistor 23 maintains the control grid 21 suitably biased with respect to its associated cathode. The triode 19 thus operates as a cathode follower stage providing a step-down impedance transformation for more effective compensation where the dynamic impedance of variable resistance photocell 16 is relatively low with respect to that of the variable photocell 15.

While there have been shown what are believed to be the best embodiments of the invention, it will be appreciated that changes and modifications may be made therein without departing from the spirit and scope of the invention as defined in the appended claim.

What I claim is:

Photometric apparatus of the class described, comprising: a single light source; a first photosensitive circuit element disposed to receive light from said light source; a second photosensitive element disposed also to receive light from said light source; circuit means connecting said first and second photosensitive circuit elements electrically in series; means to connect a source of direct current potential to said series connected first and second photosensitive circuit elements; means defining a space wherein to position a specimen of which a light transmission characteristic is to be determined, said space being disposed intermediate said first photosensitive circuit element and said light source so that only light from said light source which has passed through said space and any specimen therein impinges on said first photosensitive circuit element; said first photosensitive circuit element being of the type that develops increased current flow in response to an increase in light intensity; said second photosensitive circuit element being of the type that develops decreased electrical resistance in response to an increase in light intensity, said first and second photosensitive circuit elements being dimensioned to maintain a constant potential across said second element notwithstanding variations in the light intensity of said source; indicator circuit means connected electrically in parallel with said second photosensitive circuit element; and a cathode follower stage which is interposed between said first and second serially connected photosensitive circuit elements, said cathode follower stage being connected electrically in parallel with said first photosensitive circuit element, said cathode follower stage having an input connected for response to variations in current flow through said first photosensitive circuit element and having an output connected to transmit said current flow variations at reduced impedance to said second photosensitive circuit element.

References Cited in the file of this patent

UNITED STATES PATENTS

| 1,779,324 | Long | Oct. 21, 1930 |
| 2,178,211 | Nolan | Oct. 31, 1939 |
| 2,278,920 | Evans et al. | Apr. 7, 1942 |
| 2,436,762 | Turin et al. | Feb. 24, 1948 |
| 2,482,980 | Kallman | Sept. 27, 1949 |
| 2,560,606 | Shive | July 17, 1951 |
| 2,745,021 | Kurshan | May 8, 1956 |